United States Patent [19]
Day

[11] 3,741,012
[45] June 26, 1973

[54] METHOD FOR DETERMINING TACK
[75] Inventor: Donald T. Day, Matawan, N.J.
[73] Assignee: Ashland Oil Inc., Houston, Tex.
[22] Filed: Apr. 30, 1971
[21] Appl. No.: 139,161

[52] U.S. Cl. .................. 73/150 A, 73/58, 269/21
[51] Int. Cl. .......................................... G01n 19/04
[58] Field of Search ................ 73/150 R, 150 A, 73/58, 103; 269/21

[56] References Cited
UNITED STATES PATENTS
| | | | |
|---|---|---|---|
| 3,368,398 | 2/1968 | Skewis | 73/150 |
| 3,129,586 | 4/1964 | Allen et al. | 73/150 X |
| 3,336,797 | 8/1967 | Raffalovich | 73/150 A |

*Primary Examiner*—Richard C. Queisser
*Assistant Examiner*—Daniel M. Yasich
*Attorney*—Van D. Harrison, Jr., William Merer, Harold M. Dixon and Walter H. Schneider

[57] ABSTRACT

In a method and apparatus for testing and determining the tack properties of rubbery or polymeric compositions test specimens of polymer stock are each supported on a perforated plate or grid so that the specimen completely covers the perforated area. A differential air pressure is applied across the specimen plate contact area thereby forcing the specimen against the plate and maintaining the former in position. Two test specimens of polymer stock, each thus mounted, are then pressed together under a constant static force for a predetermined time interval. Immediately thereafter a second constant static force in a counter direction is released which tends to separate the specimens. The time required for separation is measured and is an indication of the tack of the specimens.

4 Claims, 4 Drawing Figures

PATENTED JUN 26 1973 3,741,012

Donald T. Day
INVENTOR.

BY Van D. Harrison Jr.
ATTORNEY

METHOD FOR DETERMINING TACK

NATURE OF THE INVENTION

This invention relates to the art of measuring tack and in particular to a new and improved process of an apparatus for measuring the tacky adhesion properties of rubbery or polymeric compositions.

PRIOR ART

In the rubber industry, an important consideration in the choice of rubber to be used in manufacturing various products is the property generally referred to as tack. Tack is the peculiar characteristic of rubber which causes two fresh rubber surfaces to adhere or coalesce and is of great practical importance. It is by use of tack that composite rubber articles such as tires are built. The freshened surfaces of the component parts are merely stuck together and rolled into place. The different elements such as plies and tread splice must hold during later handling. This can be a very severe demand and thus accurate determinations of tack are important. Many attempts have been made to provide a quantitative measurement of this property. A number of devices have been developed for testing the tack of rubber stock in the tire industry and for adhesives. Two techniques for measuring tack are generally used. In both techniques, the test surfaces are brought together with a predetermined constant force for a standard period of time and are then separated. The method used to separate the surfaces, distinguishes the techniques. In one the surfaces are separated at a constant rate of speed and the force required to effect the constant rate of separation is determined. In the second technique, a predetermined constant force of separation is used and the time required to separate the test specimens is measured. This latter technique is utilized in a tackmeter and method described in U.S. Pat. No. 3,368,398.

Another determination often desired is a measurement of tack between one specimen surface which has tack and a substrate that has no tack of its own. An example of such a substrate is a metal surface.

One of the problems encountered in any type of apparatus and method used to measure tack is the problem of maintaining the flexible specimen surfaces in position during the tack measurement. Some means of reenforcing the rubber specimens usually must be used. In U. S. Pat. No. 3,368,398 each of the two specimens in a test is mounted in a block and clamped thereto by a pair of L-shaped clamp members. The exposed surfaces of the samples are then brought in face to face contact and force is subsequently applied to separate the two surfaces. It has been noted that when the pulling force is applied to the two surfaces, thus reenforced and positioned, there is a "bowing" effect. The central section of each specimen tends to pull away from the holder thus imparting a convex curvature to the specimen surface. This bowing is affected by the elasticity of the rubber and introduces considerable error in the tack determination. In determining the tack of adhesive materials coated onto thin flexible materials such as paper, it again is difficult to mount specimen strips so that they will be held rigidly and not tear during testing.

OBJECTS OF THE INVENTION

It is an object of this invention to provide an improved method and apparatus for determining the tack and/or stickiness of rubber and other materials. Still another object of the invention is to provide a method and apparatus for determining tack wherein test specimens may be rapidly inserted and removed from the test apparatus. Still another object of the invention is to provide a method and apparatus whereby the specimen tack determinations are held rigidly in place without the "bowing" effect noted above. Still another object of the invention is to provide method and apparatus of determining tack wherein results of increased accuracy are obtained. These and other objects of the invention will be apparent to those skilled in the art from the description of the invention which follows.

SUMMARY OF THE INVENTION

Briefly stated, this invention comprises a method and apparatus for determining tack wherein the specimens used are maintained in position by placing each specimen against a rigid perforated plate and applying a differential pressure across the contact area of the specimen and plate. The pressure differential is such that the pressure on the exterior side of the specimen is greater than the pressure on the underside of the rigid perforated plate. While such pressure continues to be applied, the surfaces of two specimens are brought together by a force perpendicular to the area of contact for a predetermined time interval and then a force tending to separate the two surfaces is applied. Either the time required to effect separation at a constant separation force or the force required to effect separation at constant rate is measured.

PREFERRED EMBODIMENTS

Figure 1:
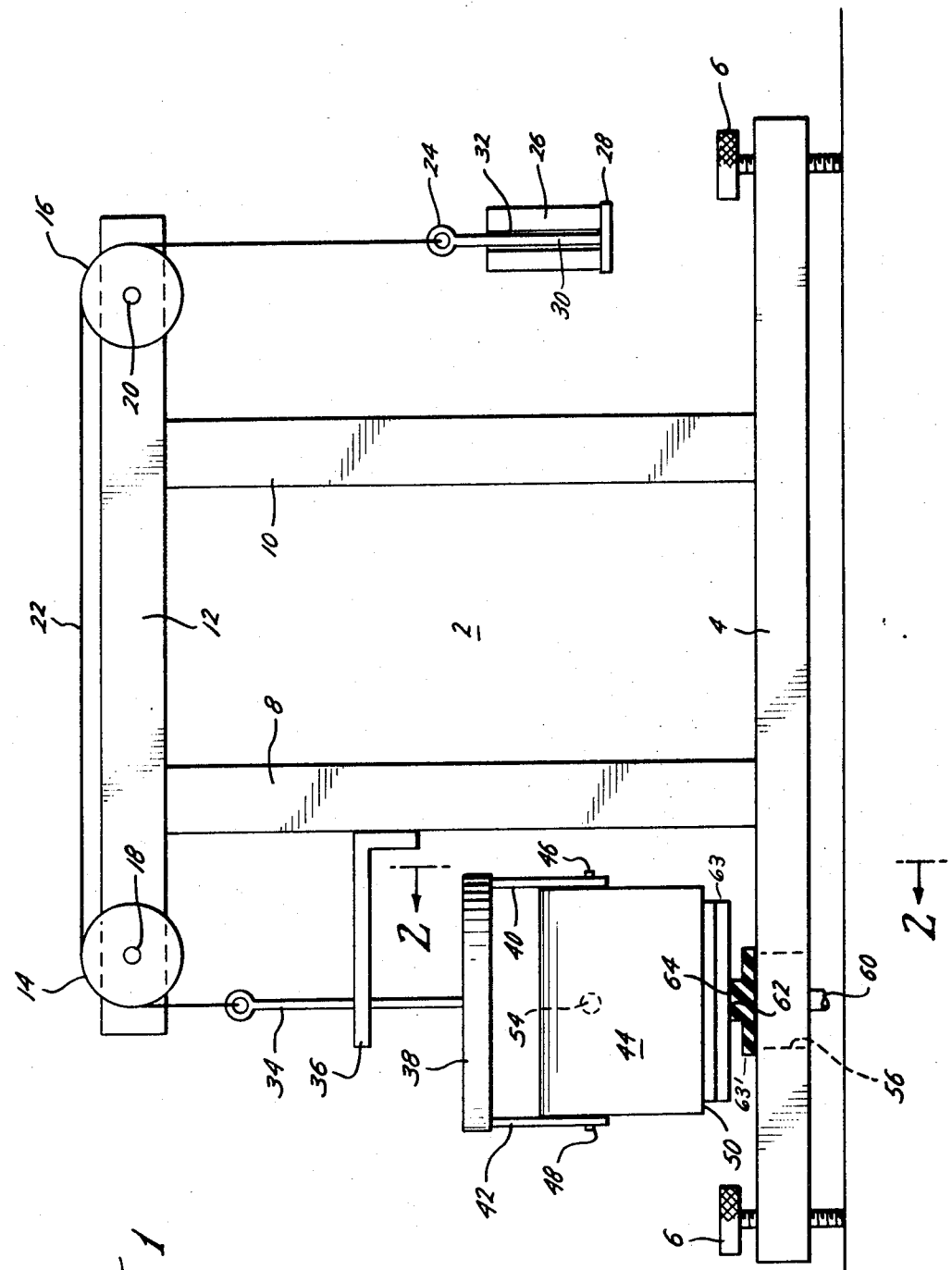
FIG. 1 is a frontal elevation view of the tack measuring apparatus of this invention constructed in accordance with the principles described herein.
Figure 2:
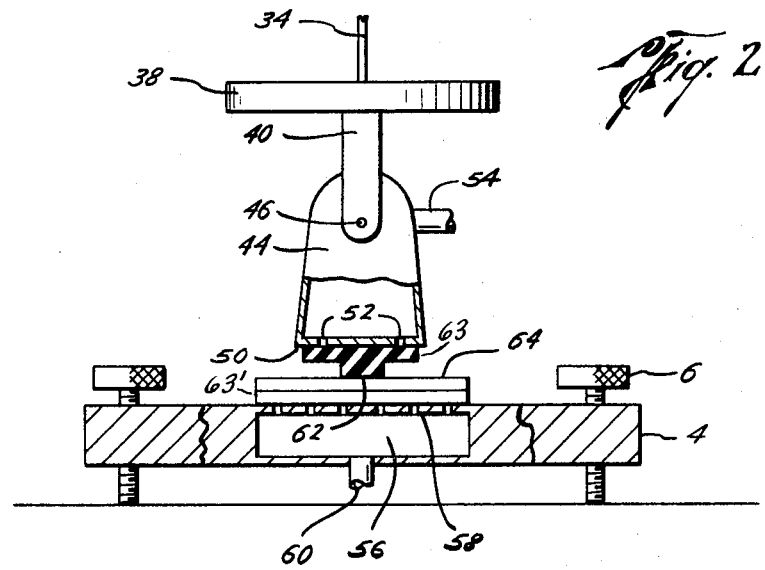
FIG. 2 is a partial sectional view of the specimen holding portion of the apparatus taken along the line 2 — 2 in FIG. 1.

Referring now to the drawings in greater detail, it will be seen that the tackometer 2 according to the present invention comprises a base plate 4 provided with leveling feet 6. Mounted on and rigidly secured to the base plate 4 are two posts 8 and 10 to the top ends of which is rigidly secured a beam member 12. Grooved pulleys 14 and 16 are mounted on axles 18 and 20, respectively, so that the two pulleys are free to revolve in the same plane. Flexible cord 22 rides in pulleys 14 and 16 and is connected with weight holder 24 supporting weight 26. Weight holder 24 and weight 26 may be of any desired design. Here the holder 24 is a rigid metal disk 28 with a vertically extending metal rod 30 attached to the center thereof. Weight 26, as depicted here, is essentially circular in cross-section with a longitudinal radial slot 32 so that weight 26 can be easily removed from or supported by disk 28.

The other end of cord 22 is attached to metal rod 34 which extends through a slot in support bracket 36 which is rigidly attached to post 8.

The slot in bracket 36 is sufficient to permit rod 34 to move freely with as little friction as possible. The function of the slot in bracket 36 is to maintain the movement of rod 34 in a vertical direction.

Figure 3:
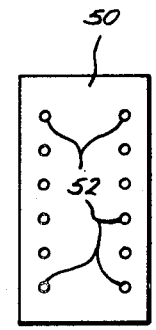
FIG. 3 is a representation of the bottom surface of the upper, free moving specimen holder depicted in FIG. 2.

Rod 34 is rigidly attached at its lower end to metal plate 38. As depicted in the drawing plate 38 is metal and is circular in horizontal cross-section although this is not a necessary configuration. Rigidly attached to the underside of plate 38 are two rigid suspension posts 40 and 42. Free-moving specimen holder 44 is supported between posts 40 and 42 by pivot pins 46 and 48. Specimen holder 44 is a hollow box-like structure made of sheet metal or other rigid material and has a flat bottom 50 with two parallel rows of perforations 52 therein. As shown in FIG. 3 the row of perforations does not extend the full length of the flat bottom but is limited to the central section. The two rows of perforations are spaced apart lengthwise a width greater than the width of the trunk portion of the test specimens (when viewed in cross-section as in FIG. 4). A vacuum port 54 attached to the wall of the holder enables a vacuum source (not shown) to be connected to the holder 44.

Stationary specimen holder 56 in its simpliest form is a box-like structure similar to holder 44 and is rigidly contained within base plate 4. Holder 56 has a flat top 58 containing two longitudinal rows of holes therein as shown in FIG. 3 and has a vacuum port 60 in one wall of the holder, preferably the bottom so that a vacuum source (not shown) can be connected to the interior of holder 56. In operating the apparatus the longitudinal axis of holder 44 is always at right angles to the longitudinal axis of holder 56 and the two test strips are always brought into contact so that their longitudinal axes are at right angles.

At the beginning of each test run ordinarily it is desired to bring the two specimen surfaces together under a predetermined contact force for a predetermined time interval. And subsequently it is desired to exert a separating force on the two test surfaces. Accordingly, it is necessary that the difference between the weight of holder 24 including support disk 28 (but not weight 26) and the combined weights of rod 34, metal plate 38, support posts 40 and 42, vacuum attachment at 54 and holder 44 be sufficient to provide the desired initial contact force. Correspondingly, it is necessary that the weight 26 be of sufficient mass that when it is placed on support disk 28 the net force exerted on the test strip surfaces is the desired separating force.

Figure 4:
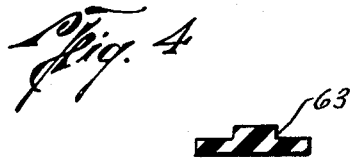
FIG. 4 is a cross-section of preferred shape of specimen utilized in the invention and to FIG. 1 specifically.

Preferably the specimens of rubber 63 to be tested for tack are T-shaped in cross-section as shown in FIG. 4 and are in the form of a long ribbon-like lengths of twelve inches or so. The specimens are prepared by pressing the rubber or polymer material into a plaque mold having the configuration capable of imparting the desired T-shaped cross-section. For example, the mold may be designed to give a finished plaque having a raised portion in cross-section (the trunk of the "T") on each specimen three-eighths or one-half of an inch wide running the length of the 12 inch by 12 inch plaque, the raised portions being spaced approximately 2 inches apart center to center. If a 12 inch by 12 inch plaque is cast, six test strips can be cut from each plaque, each strip having its own molded, raised portion which becomes the actual test surface. Two test strips are required for the testing procedure. Several test runs are made with one set of test strips each test being made on a fresh contact area.

Assuming that the polymer or rubber test strips 63 and 63' with their respective surfaces 62 and 64 have been prepared, a section of one polymer or rubber specimen strip is placed so that the flat side of the strip (the top of the crossbar of the "T") is in contact with the perforated surface of one specimen holder and similarly a section of polymer or rubber specimen strip is placed in contact with the perforated surface of the other specimen holder. A vacuum is applied to the interior of each holder. Atmospheric pressure exerted against each specimen strip presses each strip against the perforated surface of the specimen holder and maintains it in position. By spacing the two rows of perforations in each holder wider than the raised portion of the specimen strip any extrusion of specimen into the perforations will not affect the test surface itself. While the vacuum is maintained, the two specimen holders are then brought together as shown in FIG. 1 so that the test strips 63 and 63' cross at right angles and the surfaces 62 and 64 are brought together under a force equal to the weight of rod 34, plate 38, posts 40 and 42, vacuum attachment 54 and holder 44 less the weight of holder 24. Weight 26 is not in place at this time. After the two specimen surfaces have been in contact for a desired length of time, the weight 26 is added to the holder 24 thereby exerting a separating force upon surfaces 62 and 64 causing the two surfaces to separate. The period of time required for the two surfaces to separate is measured either manually with a stop watch or electronically.

Another method of applying the contact and separating forces to the test surfaces 62 and 64 may be followed. In this method, weight 26 is not removed from holder 28 at the time the two specimen surfaces are to be brought together under a predetermined force. Weight 26 is left in place and an additional weight is placed on plate 38 sufficient to generate the desired contact force between surfaces 62 and 64. When it is desired to apply a separating force, this weight is merely removed from plate 38.

At the conclusion of a test, the vacuum in each holder is released and its strip is moved lengthwise along the holder surface until two fresh opposing surfaces are exposed. The test procedure is repeated each time using a fresh rubber or adhesive surface.

The apparatus can be easily adapted to testing the "stickiness" of a material, i.e., its capacity to adhere to any type of surface such as a smooth metal surface. If this measurement is desired the unlike substrate such as the metal "specimen" can be substituted for one of the rubber or adhesive specimen samples and rigidly attached to one of the specimen holders. Other adaptations of the apparatus will be obvious to those skilled in the art.

From the foregoing disclosure, it will be apparent that the method and apparatus of this invention readily overcomes several problems in the present art of measuring tack. The necessity for re-enforcing the test specimens or complicated clamping equipment to prevent bowing has been eliminated. By eliminating bowing, the accuracy of measurement has been improved. Rapid testing is possible because test specimens are easily inserted and removed from the two holders. The preparation of test specimens is expedited through the ability to cast a number of specimens at one time.

What is claimed is:

1. A process for measuring the tack of rubbery or polymeric compositions or the stickiness of a rubbery or polymeric composition comprising:
   a. providing a pair of supports, each support having substantially horizontal, rigid surfaces, each surface having apertures therein;
   b. positioning a strip of a specimen of said composition in a substantially horizontal position upon each of said rigid horizontal surfaces so that all apertures in each surface are covered by said specimens;
   c. maintaining a differential air pressure across each said specimen and supporting rigid surface in a direction whereby each of said specimens is forced against its respective supporting rigid surface;
   d. initially bringing the exposed, substantially horizontal surface of one specimen transversely into face-to-face contact with the exposed surface of said second specimen under a constant substantially vertically applied force while applying said differential air pressure across each said specimen for maintaining said rigid horizontal surfaces and corresponding specimens in said substantially horizontal position;
   e. maintaining said face-to-face contact of said specimens for a predetermined time interval;
   f. subsequently applying a second vertical force to said horizontal specimens and supporting surfaces in a direction counter to said initial vertical force, said second vertical force being greater than said initial vertical force thereby tending to separate the surfaces of said specimens in face-to-face contact; and
   g. measuring the time or force required to effect separation of the two contacting surfaces.

2. The process of claim 1 and the step of molding each rubber or polymeric specimen into a longitudinal strip having a T-shape in cross-section.

3. The process of claim 1 wherein said differential air pressure across each specimen comprises a vacuum applied on the side of said rigid surface opposite the side in contact with said specimen.

4. The process of claim 3 wherein said specimen comprises a longitudinal strip having a T-shape in cross-section.

* * * * *